W. F. GROENE.
COUNTERSHAFT BRAKE.
APPLICATION FILED APR. 1, 1921.

1,416,017.

Patented May 16, 1922.
2 SHEETS—SHEET 1.

Inventor.
William F. Groene
by Rob... Harris.
Attorney

W. F. GROENE.
COUNTERSHAFT BRAKE.
APPLICATION FILED APR. 1, 1921.

1,416,017.

Patented May 16, 1922.
2 SHEETS—SHEET 2.

Inventor:
William F. Groene
by Rob't P. Harris
Attorney

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF OHIO.

COUNTERSHAFT BRAKE.

1,416,017. Specification of Letters Patent. Patented May 16, 1922.

Application filed April 1, 1921. Serial No. 457,785.

*To all whom it may concern:*

Be it known that I, WILLIAM F. GROENE, a citizen of the United States, residing at Cincinnati, county of Hamilton, and State of Ohio, have invented an Improvement in Countershaft Brakes, of which the following description, in connection with the accompanying drawings, is a specification, like characters on the drawings representing like parts.

The invention to be hereinafter described, relates to brake mechanisms for shafts, and more particularly as applied to countershafts.

These countershafts may be employed in factories for a great variety of purposes, and are frequently provided with cone pulleys whereby a machine may be driven from the countershaft at different speeds.

The countershaft and the cone pulleys are usually of strong, heavy construction, so that when the driving means for the countershaft is released or disconnected, the momentum of the parts causes the same to rotate for a substantial length of time before coming to rest.

As a consequence, frequently it is necessary for the operator of the machine driven from the countershaft to stand idle a substantial length of time while waiting for the countershaft to come to rest. Also, the continued rotation of the countershaft due to the momentum thereof is liable to cause accidents.

The aim and purpose of the present invention, therefore, is to provide simple, efficient, easily operated means for promptly bringing the countershaft to rest after its driving means has been disconnected therefrom.

The character of the invention may be best understood by reference to the following description of one good form thereof shown in the accompanying drawings, wherein.

Figure 1:
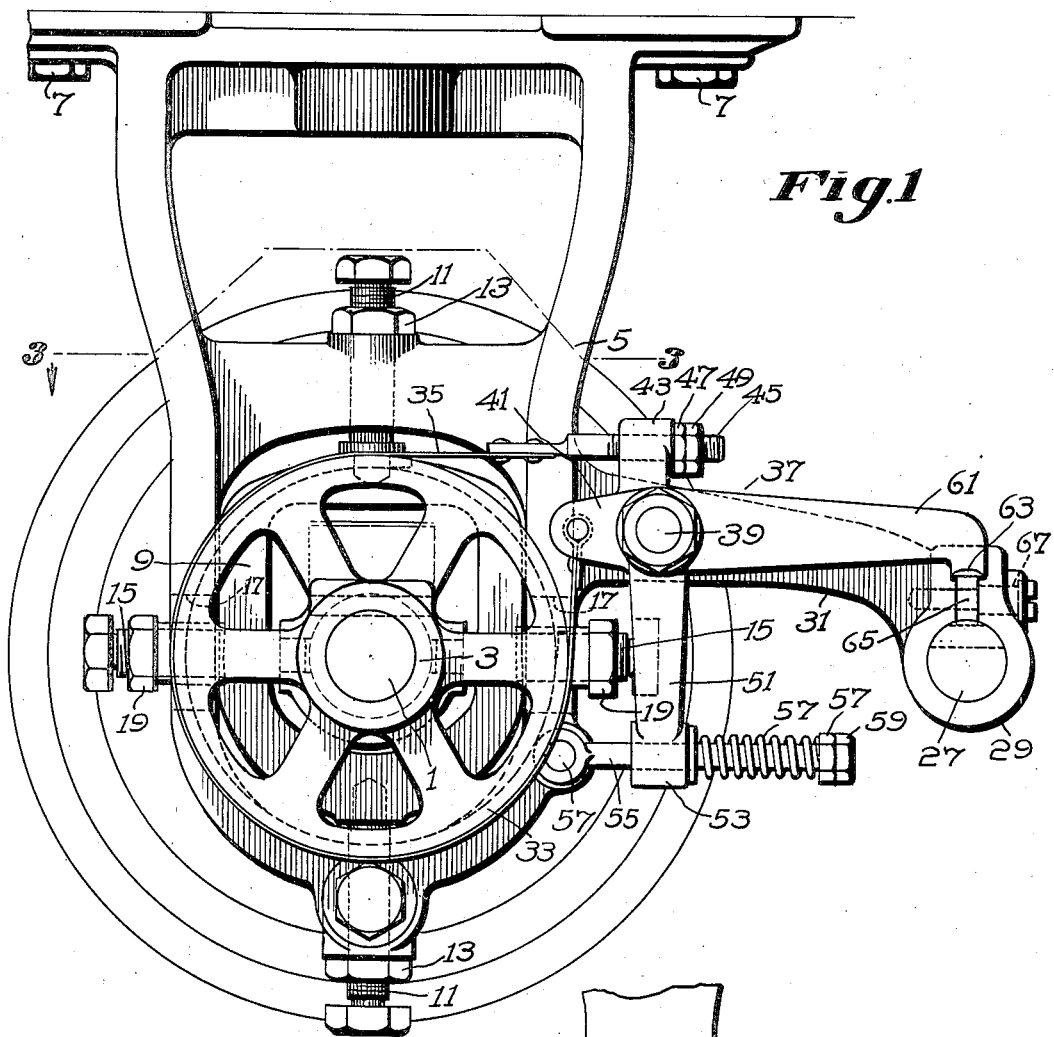
Fig. 1 is an end elevation of a construction shown as an embodiment of one good form of the invention.
Figure 2:
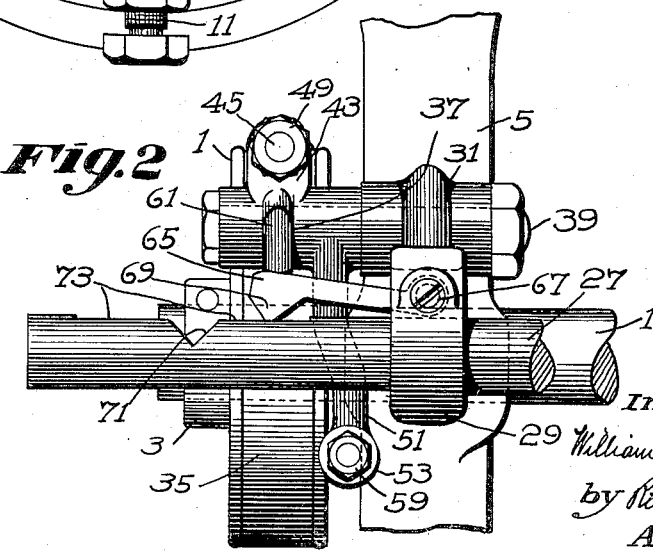
Fig. 2 is a detail of a portion of the mechanism.
Figure 3:
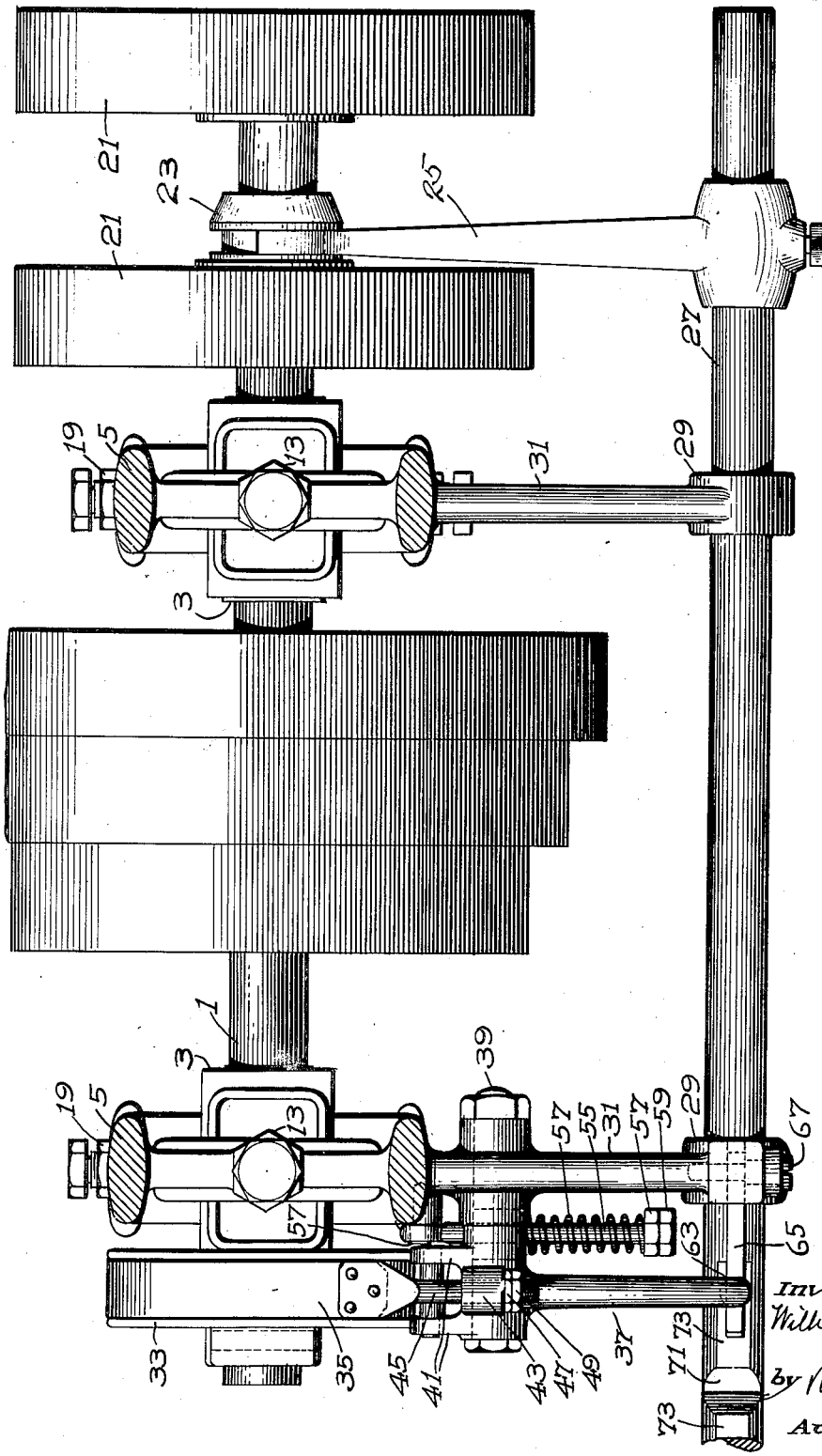
Fig. 3 is a horizontal section taken on line 3—3 of Fig. 1.

Referring to the drawings, the construction shown therein as one good form of the invention, comprises a countershaft 1 which may be journalled in bearings 3 which may be suitably supported. In the present instance of the invention, these bearings are carried by brackets or hangers 5 which may be connected by bolts 7 with a suitable support.

It is desirable that these bearings shall be adjustably carried by the hangers, in order that the countershaft may be aligned properly. To accomplish this, in the present instance of the invention, the bearings may be mounted in yokes 9 having upper and lower sockets receiving the ends of adjusting screw bolts 11 threaded into the brackets 5 and secured by lock nuts 13. The construction is such that the yokes may be adjusted vertically as desired.

The yokes may be substantially larger than the boxes so as to admit lateral adjustment of the latter. In the present instance, this is accomplished by adjusting screw bolts 15 entered loosely through elongated openings 17 in the brackets and threaded into the yokes. Reduced ends of these screw bolts are entered in sockets in the bearings. The screw bolts may be held in their positions of adjustment by sleeve lock nuts 19 adapted to bear against the yokes. The construction is such that by means of these screw bolts 15, the boxes may be laterally adjusted as desired.

Suitable means may be provided for driving the countershaft. For this purpose, in the present instance of the invention, loose pulleys 21 may be mounted on the countershaft and may be driven in the same or in opposite directions from any suitable source of power. These pulleys may be alternatively connected to the countershaft by a cone clutch 23 splined to the countershaft and shiftable into engagement with conical recesses in the hubs of the pulleys 21. Since this cone clutch construction is well known, it is unnecessary to show the same in detail herein.

To shift the clutch, a fork arm 25 may be provided fast on a shifter rod 27 adapted to slide in bearings 29 in arms 31 projecting laterally from the brackets 5. The shifter rod may be slid longitudinally by any suitable means unnecessary to be shown herein.

As stated, it is desirable that when the clutch 23 is shifted to its intermediate position to release either of the driving pulleys, that the countershaft shall be promptly arrested. The brake mechanism, to accomplish this in the present instance of the invention, comprises a brake wheel 33 fast on the counter shaft, and provided with a brake band 35 having suitable internal surface material.
To control the brake, a lever 37 may be provided fulcrumed on a bolt 39 carried by one of the brackets 5. This lever, in the present instance, has a short arm 41 secured to one end of the brake band, and a short arm 43 having a bore loosely receiving a screw 45 having an adjusting nut 47 and a lock nut 49 threaded thereon. The construction is such that the screw 45 may be adjusted to set the brake band in the position desired.
The lever 37 also has a long arm 51 projecting downward from the fulcrum bolt 39, and terminates in a boss 53 receiving a pin 55 fulcrumed on a bolt 57 carried by one of the brackets 5. A coil spring 57 encircles the pin 55, and is confined between a face of the boss 53 and an adjusting nut 57 held by a lock nut 59.

The construction is such that the spring tends to react against the nut 57 and slide the arm 51 along the rod 55 so as to tighten the brake band on the brake wheel. By adjusting the nuts 57 and 59, the tension of the spring and the brake effect may be varied as desired.
The lever 37 also has a long arm 61 projecting laterally from the fulcrum bolt 39, and provided with a heel 63 adapted to bear on a finger 65 fulcrumed on a screw 67 carried by one of the bracket arms 31 referred to. The finger 65 has a wedge-shaped toe 69 adapted to enter a similarly shaped notch 71 in the shifter rod 27. The toe is also adapted to engage slabbed-off faces 73 on the shifter rod adjacent the notch 71.
The construction is such that when the shifter rod is slid longitudinally to throw the clutch 23 to its intermediate position to release either of the driving pulleys 21, the wedge-shaped toe of the finger will slide along the shifter rod and drop into the notch 71. Thereupon, the coil spring 57 will become effective to rock the four-armed lever 37 in a clockwise direction and apply the brake. As a result, the countershaft will be brought to rest promptly and automatically on release of the driving pulleys. The dropping of the wedge-shaped toe of the finger 65 into the notch may also determine the adjustment of the cone clutch 23 to its intermediate neutral position without requiring attention on the part of the operator.

When it is desired to again rotate the countershaft, the shifter rod is adjusted to the right or left depending on which of the driving pulleys it is desired to connect with the countershaft. Thereupon, the wedge-shaped toe of the finger 65 will be caused to ride up out of the notch 71 and along one or the other of the slabbed-off faces 73 of the shifter rod. The finger in turn will press the lever arm 61 upward against the resistance of the coil spring 57 and release the brake.

The spring actuated arm 51 is long, and the brake actuating arms 41 and 43 are short. As a consequence, the spring operates with desirable mechanical advantage in applying the brake. Also, the finger actuated arm 61 is long, and in the present instance, is substantially longer than the spring actuated arm 51. As a consequence, this facilitates compression of the coil spring to release the brake. The construction is such that the device may be easily operated both to apply and release the brake.

The brake mechanism is desirably located at one side of one of the brackets, and therefore, is out of the way and does not interfere with adjustment of the bearing carried by this bracket.

It will be understood that the invention is not limited to the specific embodiment shown, and that various deviations may be made therefrom without departing from the spirit and scope of the appended claims.

What is claimed is:—

1. A mechanism of the character described, comprising a countershaft, driving means therefor, means to connect the driving means with the shaft or disconnect the same therefrom, including a shifter rod, a brake wheel mounted on said shaft, a brake band for said wheel, a lever having a pair of arms connected to the ends of the brake band, an applying arm and a releasing arm, a spring co-operating with the applying arm to apply the brake, and a finger for engagement with the releasing arm and adapted slidably to engage the shifter rod, the latter having a notch to allow the finger to drop therein to apply the brake.

2. A mechanism of the character described, comprising a countershaft, cone pulleys thereon, a driving wheel loose on said shaft, a clutch detachably to connect the driving wheel with the shaft, a shifter rod for operating the clutch, a brake wheel on said shaft, a brake band on said wheel, means including a spring tending to apply the brake, and a member actuated by the shifter rod to render said spring effective on shifting of the rod to move the clutch to release the driving wheel from the shaft.

3. A mechanism of the character described, comprising brackets, bearings carried by said brackets, a shaft journalled in said bearings, a driving wheel for said shaft, means detachably to connect the driving wheel with said shaft, arms projecting from said brackets, a shifter rod slidably carried by said arms, means to impart movement from said rod to said means for detachably connecting the driving wheel with said shaft, a brake for said shaft comprising a wheel fast on said shaft, a band on said wheel, a lever carried by one of said brackets having arms connected to ends of said band, a spring-pressed arm and an actuating arm, and a finger fulcrumed on one of said bracket arms to transmit movements from the shifter rod to the lever operating arm to apply the brake when the shifter rod is operated to release the driving wheel from the shaft and to release the brake when the shifter rod is operated to connect the driving wheel with the shaft.

4. A mechanism of the character described, comprising a shaft, a shifter rod extending parallel to said shaft, driving means for said shaft, a brake for said shaft having an operating lever and a spring tending to move the lever to apply the brake, means operated by the shifter rod for connecting the driving means with the shaft or disconnecting the same therefrom, and means including a notch in the shifter rod and a finger co-operating with said notch for operating the brake lever to apply the brake on disconnection of the driving means from the shaft, and to release the brake on connection of the driving means with said shaft.

5. A mechanism of the character described, comprising, a shaft, driving means therefor, a brake for said shaft having a spring tending to apply the brake, a shifter rod for controlling said driving means, means for placing the brake under the control of the shifter rod and mounted for movement laterally to the axis of the shifter rod upon movement of the latter, said shifter rod movable to a position to release the driving means from the shaft and apply the brake, and movable to a position to release the brake and connect the driving means with said shaft.

6. A mechanism of the character described, comprising a shaft, driving wheels therefor, a clutch for alternatively detachably connecting said driving wheels with said shaft, a brake for said shaft having a spring tending to apply the brake, and a shifter rod operatively connected with said clutch and brake movable to positions to cause the clutch to connect the driving wheels with the shaft, and movable to a position intermediate said positions to disconnect the driving wheels from the shaft and render the spring effective to apply the brake.

7. A mechanism of the character described, comprising a shaft, a brake therefor comprising a wheel on said shaft, a band on said wheel, a lever having arms connected to the terminals of the brake band, an applying arm and an operating arm, a spring co-operating with the applying arm tending to apply the brake, a shifter rod having a depression therein, and a member between the shifter rod and operating arm for rocking the lever to render the spring effective when the rod is shifted to allow the member to drop into the depression and for releasing the brake when the rod is shifted to move the depression out of registration with said member.

8. A mechanism of the character described, comprising a shaft, a brake therefor comprising a wheel fast on said shaft, a band on said wheel, a lever having a pair of arms connected to the respective terminals of said band, an applying arm and an actuating arm, a member projecting through said applying arm, a spring on said member co-operating with said applying arm to apply the brake, and means co-operating with said actuating arm to rock the lever against the resistance of the spring to release the brake or to render the spring effective to apply the brake.

9. A mechanism of the character described comprising a shaft having different driving means, a shifter rod movable in one direction to place the shaft under the control of one of the driving means and movable in the opposite direction to place the shaft under the control of the other driving means, and movable to an intermediate position to release the shaft from both driving means, a brake for said shaft having a spring tending to apply the brake, and means for controlling the brake from the shifter rod operable upon movement of the shifter rod to the intermediate position to apply the brake and yieldingly lock the shifter rod in the intermediate position, and operable to release the brake upon movement of the shifter rod in either direction from the intermediate position.

In testimony whereof, I have signed my name to this specification.

WILLIAM F. GROENE.